Feb. 26, 1935.　　　W. J. ABEL　　　1,992,563

SPEEDOMETER

Filed Oct. 15, 1929　　　3 Sheets-Sheet 1

Inventor

Walter J. Abel

By Clarence A. O'Brien
Attorney

Feb. 26, 1935.  W. J. ABEL  1,992,563
SPEEDOMETER
Filed Oct. 15, 1929  3 Sheets-Sheet 2
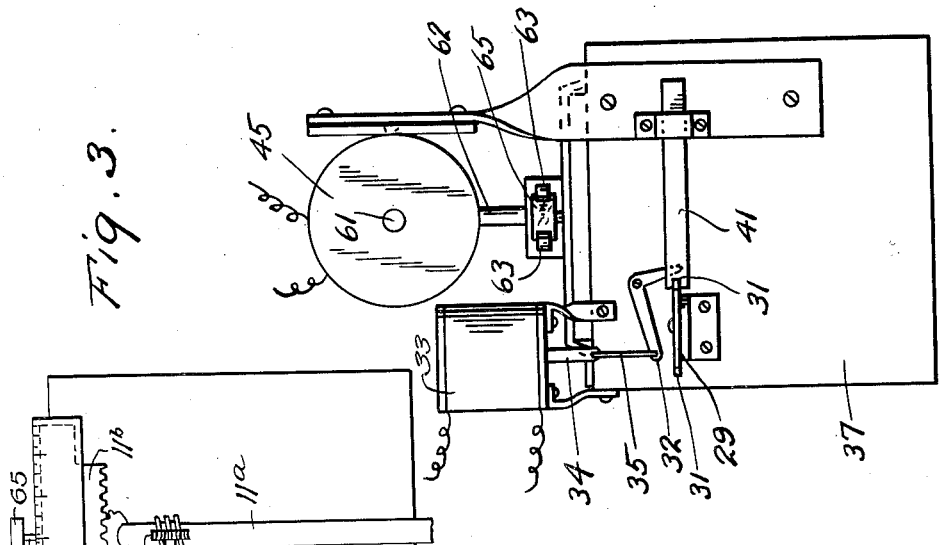
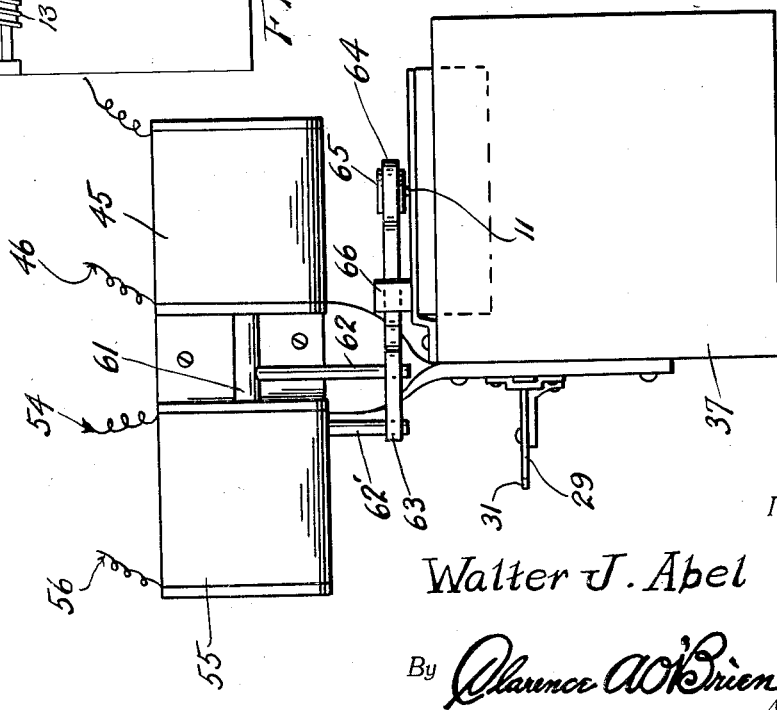
Inventor
Walter J. Abel
By Clarence A. O'Brien
Attorney Feb. 26, 1935. W. J. ABEL 1,992,563
SPEEDOMETER
Filed Oct. 15, 1929   3 Sheets-Sheet 3
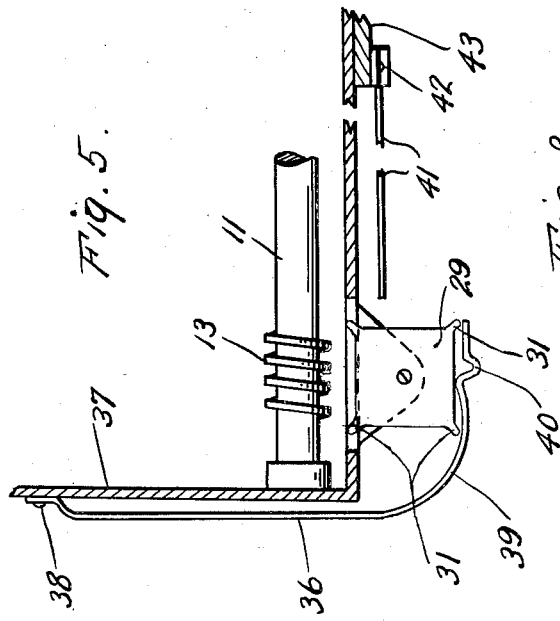
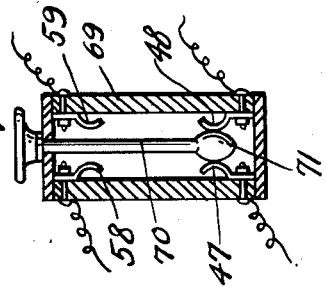
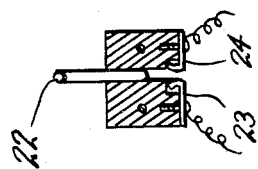
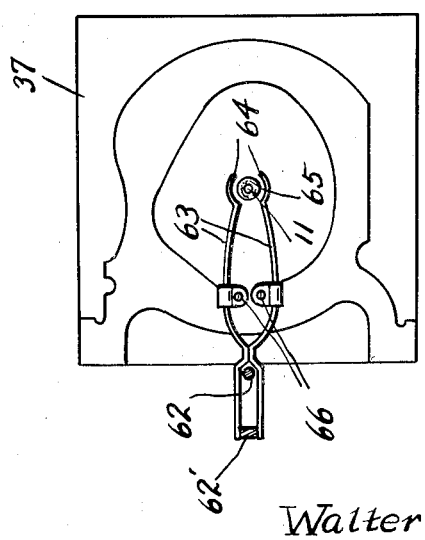
Inventor
Walter J. Abel
By Clarence A. O'Brien
Attorney Patented Feb. 26, 1935

1,992,563

UNITED STATES PATENT OFFICE 1,992,563

SPEEDOMETER

Walter James Abel, Vancouver, British Columbia, Canada

Application October 15, 1929, Serial No. 399,869

1 Claim. (Cl. 177—311.5)

The present invention appertains to new and useful improvements in speed indicators, and more particularly to novel electrical magnetic means for stopping the indicator shaft of a conventional speedometer when the usual vehicle brake is applied and retaining the said indicating shaft at the indicating speed position thereof after the brake lever has been released, thus permitting an officer of the law or other party to ascertain the rate of speed at which the vehicle was travelling when the brake was applied.

During the course of the following specification and claim, numerous important objects and advantages of the invention will readily become apparent.

In the drawings:

Figure 2 represents a side elevation of the magnetic means for locking the speedometer indicating shaft.

Figure 3 represents an end elevation of the magnetic means for locking the indicator shaft of a speedometer and also showing an additional solenoid for releasing the indicator shaft.

Figure 4 represents a top plan view in partial section disclosing the means for clamping the indicator shaft against movement.

Figure 5 represents a fragmentary sectional view of the means for releasing the indicator shaft of the speedometer.

Figure 6 represents a fragmentary detail sectional view of a switch.

Figure 7 represents a cross sectional view of a switch shown in Figure 6.

Figure 8 represents a longitudinal sectional view through a manually operable switch of the invention.

Figure 9 is a diagrammatic view showing the special type of speedometer with which the present invention is incorporated.

Figure 1:
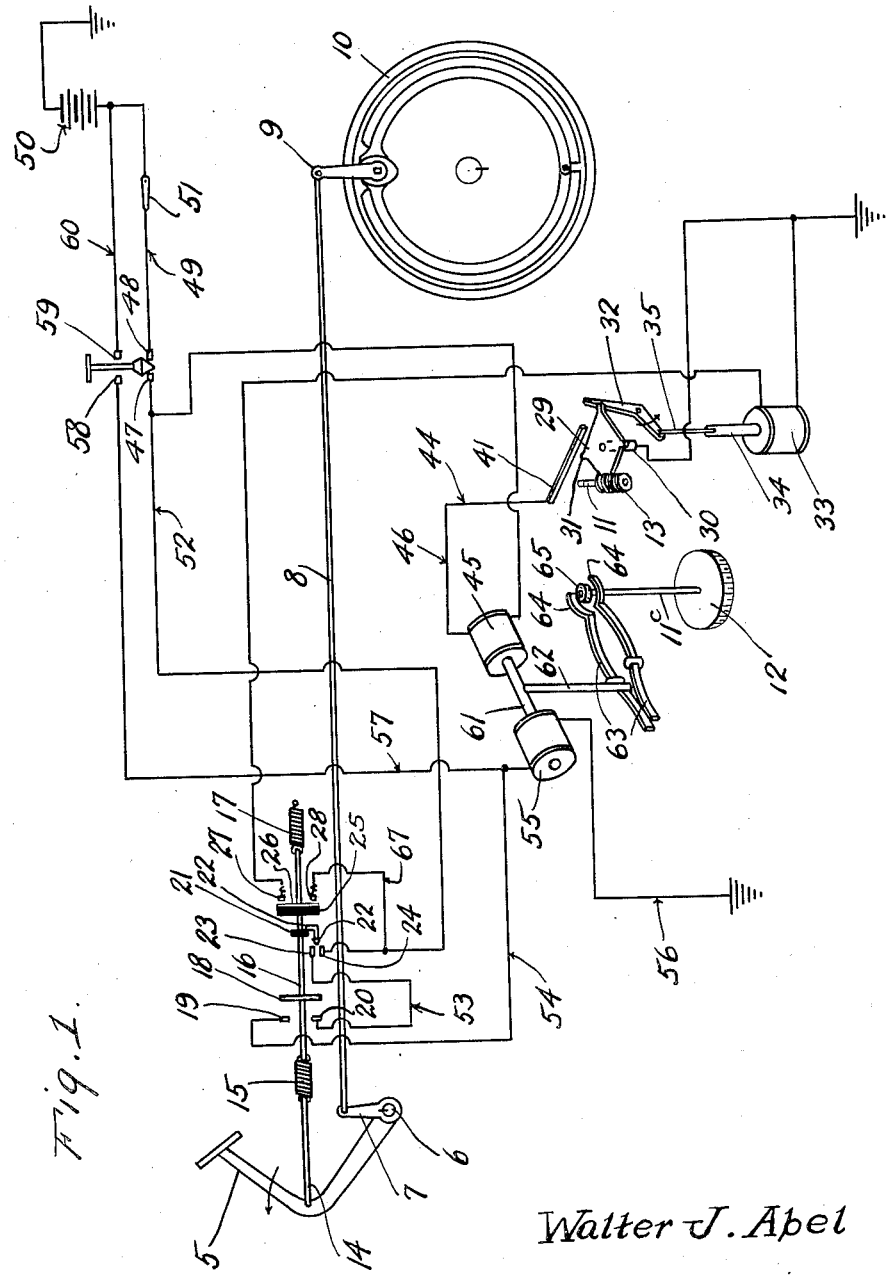
Figure 1 represents a diagrammatic view disclosing the electrical connection between the various electrical elements of the invention.

Referring to the drawings wherein like numerals designate like parts, it will be seen that numeral 5 denotes the usual foot brake pedal suitably keyed to the shaft 6. The shaft 6 has a bellcrank 7 thereon and to the free end of the bellcrank, one end of the brake rod 8 connects. This brake rod extends rearwardly from the bellcrank and connects to the cam lever 9 of the conventional brake mechanism denoted generally by numeral 10. Numeral 11 denotes a shaft to which the drive shaft 11ª is geared. The shaft 11ª is geared to the usual disk 11ᵇ of the magnetic type speedometer shown in Figure 9, which disk controls the indicator 12 from which projects the shaft 11ᶜ having the drum 65 thereon. A worm 13 is located on the shaft, as shown in Figures 1 and 5.

As is shown in Figure 1, a link 14 extends from the foot pedal 5 and connects to a spring 15 at one end, while a rod 16 connects at one end to the opposite end of the spring 15 and has its opposite end secured to one end of a coiled spring 17, the last mentioned spring having its remaining end suitably secured to some stationary member of the vehicle structure.

The rod 16 carries a bridgepiece 18 and a pair of contacts 19 and 20 are located within the path of the said bridgepiece 18. The rod 16 also carries a block 21 of some suitable insulating material which is adapted to engage the laterally disposed end of a switch member 22 which is provided with a head for bridging the contacts 23 and 24. The rod 16 also carries a second block 25 of insulating material, which block has a strip 26 of current conductive material secured to the rear side thereof. This strip 26 is adapted to bridge the contacts 27 and 28 located within the path of the block 26.

The worm 13 is located adjacent a square shaped plate 29 rotatably mounted on the spindle 30. (See Figure 1). The plate 29 has a projection 31 at each corner thereof, these projections being adapted to mesh with the worm 13 as in the manner clearly shown in Figures 1 and 5. A substantially L-shaped rocker arm 32 is located adjacent the worm 13. A solenoid 33 equipped with a slidable core 34 has a link connection 35 between its outer end and one end of the rocker arm 32.

The opposite end of the rocker arm 32 is adapted to abut the projections 31 of the plate 29 in the manner substantially shown in Figure 1. As is clearly shown in Figure 5, an elongated leaf spring 36 has one end secured to the speedometer housing 37 as at 38 and has its free end curved as at 39 in the general direction of the square plate 29. The end portion of the leaf spring 36 is offset as at 40 to retain the plate 29 by engaging one of the projections 31, as in the manner shown in Figure 5.

A second leaf spring 41 is secured at one end as at 42 and interposed between this end of the spring and the housing 37 of the speedometer is a plate 43 of some suitable insulating material. This spring 41 is connected by way of the jumper 44 to one side of a solenoid coil 45, the opposite side of the coil being connected by way of the conductor 46 to a contact 47.

An opposed contact 48 is connected by way of the wire 49 to the positive side of the battery 50, a switch 51 being interposed in this connection 49. A connection 52 is also made between the contact 47 and the contact 24 located adjacent the rod 16, while the opposed contact 23 is connected to the contact 20 by way of the jumper 53. The opposed contact 19 has a conductor 54 extending therefrom and connected to one side of the solenoid coil 55, the opposite side of the coil being grounded to the wire 56.

A connection 57 is also made from the first mentioned side of the coil 55 to the contact 58, while the opposed contact 59 is connected by way of the wire 60 to the positive side of the aforementioned battery 50. The solenoid coils 45 and 50 have a common core or armature 61 from the intermediacy of which depends an arm 62.

As is clearly shown in Figure 1, a pair of complementary clamp members 63—63 are arranged in opposed relation, the same being bowed at their intermediacies and provided at adjacent ends with arcuate shaped extensions 64, which may clamp against the fiber collar 65 on the indicator shaft 11c of the speedometer. The opposite ends of the clamp members converge and between the same the arms 62 depend when the solenoid 55 is energized. Normally the arms 62 depend between the bowed portions of the clamp members, at which time the arcuate extensions 64 are spaced from the collar 65, the clamp members being swingable on their fulcrums 66.

It is obvious that the clamp members may be operated by cam means associated with the solenoids 45 and 55 without departing from the spirit and scope of this invention.

In the operation of the mechanism, the plate 29 is held by the spring 39 with its projections 31 out of engagement with the worm 13, a pair of said projections being engaged with the spring in a position with the intervening portion of the plate spanning the offset 40 in the spring 39.

The solenoid 33 is not energized because the switch plate 26 is slightly spaced from the contacts 27—28.

Obviously, when the contacts 47—48 of the manual switch are bridged in the manner shown in Fig. 1, and the brake pedal 5 is depressed so that the plate 18 bridges the contacts 19—20 and the plug 22 bridges the contacts 23—24, current will flow from the battery 50 along the conductor 52 through the contacts 23—24 and 19—20 to the coil 55 which attracts the armature 61, moving the clamp actuator 62 so as to bring the jaws 64—64 against the fiber disk 65 on the speedometer indicator shaft 11, thus stopping the shaft with the hand at the speed reading on the usual speedometer dial at which the vehicle was travelling at the time the brake pedal was depressed.

Due to the fact that the members 63 are of spring material, the mere de-energization of the coil 55 will not result in the return of the armature 61 and obviously some pull must be exerted on the armature 61 to disengage the actuating member 62 and this is accomplished by energizing the coil 45.

As can be clearly seen in Fig. 1, a conductor extends from the conductor 52 adjacent the contact 47 to one side of the coil 45 while the other side of the coil is connected by a wire 44 to the spring contact arm 41, it being seen in Fig. 1 that the aforementioned plate 29 is grounded.

Referring again to the switch plate 26, it can be seen that when the plunger rod 16 moves backwardly upon the release of the foot pedal 5, the tension of the spring 17 will be sufficient to pull the plunger 16 backwardly for a moment farther than the pedal 5 will travel. This is nothing more than a mere jar motion, but accomplishes the bridging of the contacts 27—28 by the plate 26 which permits current to travel from the conductors 52 and 67 to the conductor which leads to the solenoid coil 33.

This momentary energization of the solenoid swings the rocker arm 32 resulting in a kick of the plate 29 as the rocker arm engages one of the projections thereof, and this swings the plate to a position so that one of the projections is resting on the edge of the spring offset 40, and due to the tension of the spring and the oblique disposition of this offset, the plate 29 will be moved a slight distance farther so that its projection adjacent the worm will engage with the thread thereof.

Obviously, this shaft 11 of the speedometer mechanism is continuously in operation, and is rotating relatively slow, so that the speedometer indicator shaft 11 will not be released for a few minutes as desired, and until the projection 31 approaching the spring contact arm 41 actually engages said arm whereupon the circuit with the coil 45 is energized resulting in the attraction of the armature 61 to the coil 45.

Obviously, the coil 55 can be actuated independently by hand by actuating the contactor to close the contacts 58—59. This particular switch is clearly shown in Fig. 8.

A manual switch is generally referred to by numeral 68 and includes a housing 69 and a plunger slidable through one end thereof. The plunger 70 is equipped with a head 71 for bridging either the contacts 47—48 or the contacts 58—59. By properly setting this manual switch, the mechanism may be released or set as desired.

While the foregoing description specifically sets forth the invention, it is to be understood that various changes in the shape, size and materials may be resorted to without departing from the spirit and scope of the invention as claimed hereinafter.

Having thus described the invention, what is claimed as new is:

A speedometer control for an automobile, comprising a speed indicating means of the drag type, a first switch operated by depression of the brake pedal of the automobile, a second switch operated by sudden release of said pedal, a brake which when operated clamps said speed indicating means in fixed position, means operated by operation of said first switch for operating said brake, a worm directly driven by said automobile, a rotary plate having projections meshable with said worm, a spring for normally maintaining the plate positioned with the projections out of engagement with the worm, a solenoid, means to energize said solenoid upon operation of said second switch, a rocker operated by said solenoid to move said plate so that one of its projections engages the worm, a spring contact adjacent the plate and with which one of the projections engages when the plate has been rotated a predetermined distance by the worm, and means operated by engagement of said last spring and plate to release said brake.

WALTER JAMES ABEL.